United States Patent
Wu et al.

(10) Patent No.: US 10,642,644 B2
(45) Date of Patent: May 5, 2020

(54) MEMORY MANAGEMENT METHOD AND APPARATUS

(71) Applicant: Intel Corporation, Santa Clara, CA (US)

(72) Inventors: Keqiang Wu, San Ramon, CA (US); Jiwei Lu, Pleasanton, CA (US); Koichi Yamada, Los Gatos, CA (US); Yong-Fong Lee, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 784 days.

(21) Appl. No.: 15/193,562

(22) Filed: Jun. 27, 2016

(65) Prior Publication Data

US 2017/0371578 A1    Dec. 28, 2017

(51) Int. Cl.
 *G06F 9/46* (2006.01)
(52) U.S. Cl.
 CPC .................................... *G06F 9/467* (2013.01)
(58) Field of Classification Search
 CPC ......... G06F 9/466–467; G06F 11/1474; G06F 12/0828; G06F 16/1865; G06F 2201/87
 See application file for complete search history.

(56) References Cited

U.S. PATENT DOCUMENTS

| 8,099,726 | B2* | 1/2012 | Harris | G06F 8/443 717/151 |
| 9,411,363 | B2 | 8/2016 | Wu et al. | |
| 2008/0126764 | A1* | 5/2008 | Wu | G06F 9/466 712/226 |
| 2009/0172654 | A1* | 7/2009 | Zhao | G06F 9/45516 717/158 |
| 2015/0113229 | A1* | 4/2015 | Boettiger | G06F 9/528 711/145 |
| 2015/0378922 | A1* | 12/2015 | Greiner | G06F 12/084 711/125 |

FOREIGN PATENT DOCUMENTS

WO    WO2016094030 A1    6/2016

OTHER PUBLICATIONS

"Intel® Architecture Instruction Set Extensions Programming Reference," Feb. 2012; pp. 506-529.

* cited by examiner

*Primary Examiner* — Nicholas J Simonetti
(74) *Attorney, Agent, or Firm* — Schwabe, Williamson & Wyatt, P.C.

(57) ABSTRACT

Methods, apparatus, and system to identify a memory contention with respect to a process, re-write the process to form a transactional process, and execute the transactional process in a speculative execution.

25 Claims, 7 Drawing Sheets

MEMORY MANAGEMENT METHOD AND APPARATUS

FIELD

The present disclosure relates to a computing device, in particular to, memory management to reduce memory contention.

BACKGROUND

Computing devices such as laptops, tablets and/or smart phones generally include a processor, memory and one or more peripheral devices. The processor may include one or more processing units, e.g., core(s), configured to execute one or more software application(s). A process, i.e., an executing software application, may include one or more thread(s). The processor may be configured to execute one or more process(es) and/or thread(s) generally in parallel. The process(es) and/or thread(s) may share the processing unit(s) in a time slice fashion, managed by, for example, a scheduler included in an operating system (OS).

Multithreaded applications take advantage of increasing number of cores to achieve high performance. However, writing multi-threaded applications requires programmers to manage access to data sharing among multiple threads. Access to shared data typically requires synchronization mechanisms. These mechanisms serialize operations on the shared data, often through the use of a critical section protected by a lock.

In computer science, "concurrency" describes the extent to which units of an application can be executed out-of-order or in partial order, without changing the result. Concurrency is desirable, because parallel execution of concurrent units can improve overall speed of execution in multi-processor and multi-core systems.

However, synchronization and serialization can limit concurrency. For example, if a lock is held by thread A, thread B has to wait until thread A releases the lock, even if the two threads access different table entries and have no data conflict. As a result, programmers try to reduce synchronization overhead. Programmers do this by reducing the use of synchronization or by using fine-grain locks, e.g. multiple locks which each protect different shared data. For example, in the example of threads A and B, instead of using a single lock, the application may use multiple locks to synchronize access to different parts of the table. Threads A and B access different table entries, use different locks for their accesses, and therefore, they do not need to wait for one another. However, to develop a multi-threaded application with fine grain locking demands expertise and requires additional effort for debugging, such as to avoid deadlock. This can increase the cost of software development.

Even in the case of fine-grain locks implemented correctly, lock locality can overtake lock granularity and become its own performance bottleneck.

Transactional programming allows programmers to write software and designate processes for speculative or transactional execution. An example is INTEL® TRANSACTIONAL SYNCHRONIZATION EXTENSIONS ("TSX"). TSX allows programmers to write coarse-grained locks; the computer processor dynamically determines which threads can be serialized. However, to take advantage of these features, programmers still need to be trained to specify code regions which are to take advantage of TSX and they still need to write and deploy TSX-enabling code, often across a diverse code base executed by diverse hardware (not just hardware from only one vendor). The resulting burden on programmers slows adoption of transactional programming as a technique to reduce synchronization overhead.

Figure 1:
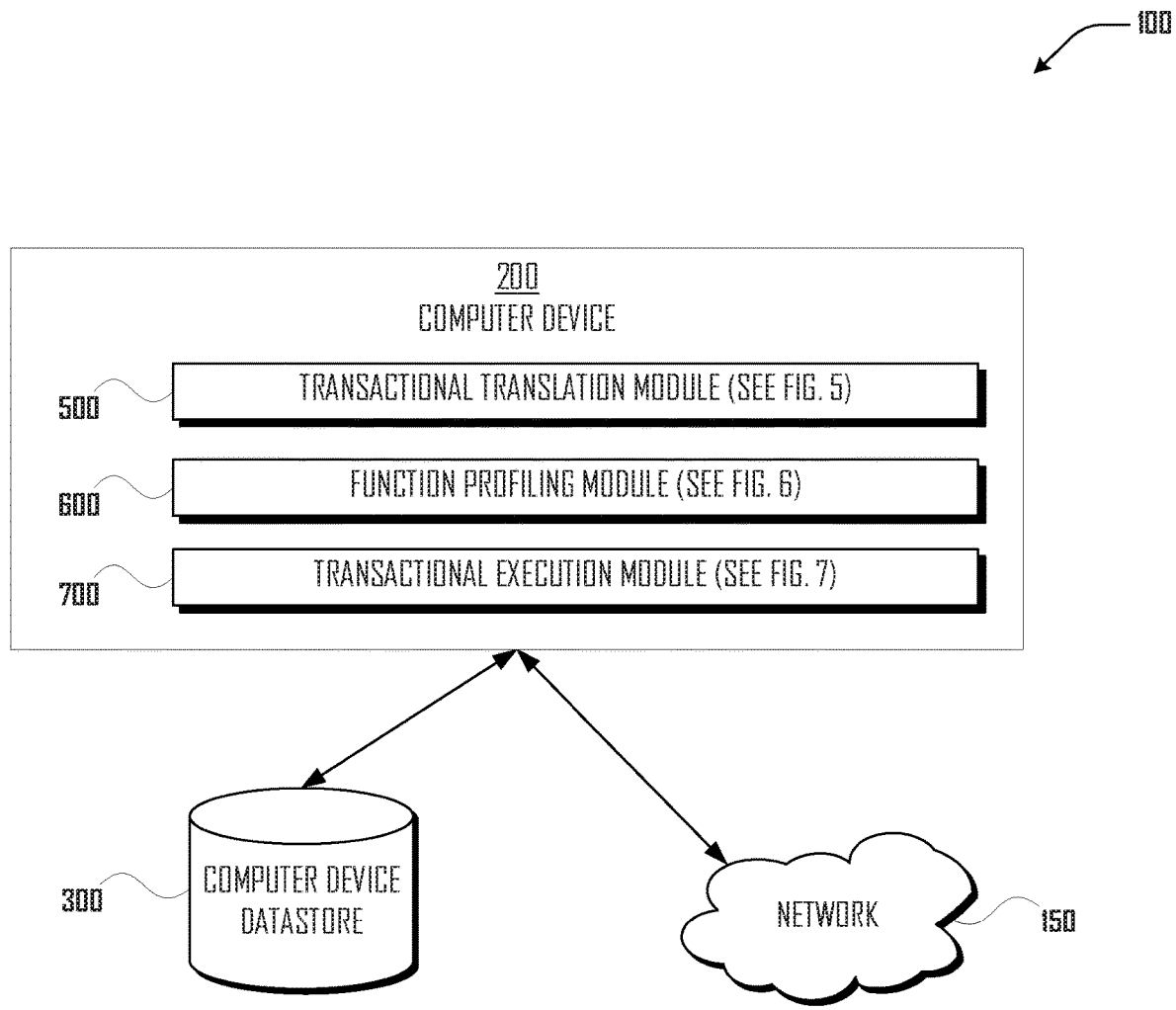
FIG. 1 is a network and device diagram illustrating an example of at least one computer device in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs or a combination, a combinational logic circuit, and/or other suitable components that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

Transactional execution: When transactional execution completes successfully, all memory operations performed within a transactional region will appear to have occurred instantaneously when viewed from other logical processors. A processor makes architectural updates performed within the region visible to other logical processors only on a successful commit, a process referred to as an atomic commit.

Atomicity: In concurrent programming, an operation (or set of operations) is atomic, linearizable, indivisible or uninterruptible if it appears to the rest of the system to occur instantaneously. Atomic operations do not actually occur instantaneously. Atomic operations do not actually occur instantaneously, they only appear to. The system behaves as if the operation or set of operations occurred instantly, separated by pauses. Because of this, implementation details may be ignored by the user or programmer, except insofar as they affect performance. Atomicity is a guarantee of isolation from concurrent processes. Atomic operations may be understood to either successfully change the state of the system or have no apparent effect. Atomicity may be enforced by mutual exclusion, whether at the hardware level building on a cache coherency protocol, or the software level using semaphores or locks.

Speculative execution: a computer system performs a task that may not be needed, to prevent a delay that may otherwise occur if the task is needed. If it turns out the work was not needed, changes made by the task are reverted and the results are ignored. The present disclosure discusses wherein memory contention is identified during, for example, runtime, object code is re-written as, for example, modified process 275, and modified process is executed speculatively.

Speculative multithreading, aka thread level speculation: Dynamic parallelization using out-of-order execution; speculative execution at the thread level as opposed to the instruction level.

Lock granularity: A measurement of the amount of data a lock protects. In general, choosing a coarse granularity (a small number of locks, each protecting a large segment of data) results in less lock overhead when a single process is accessing the protected data, but worse performance when multiple processes are running concurrently. This is because of increased lock contention. The more coarse the lock, the higher the likelihood that the lock will stop an unrelated process from proceeding. Conversely, using a fine granularity (a larger number of locks, each protecting a fairly small amount of data) increases the overhead of the locks themselves but reduces lock contention. Granular locking where each process must hold multiple locks from a common set of locks can create subtle lock dependencies. This subtlety can increase the chance that a programmer will unknowingly introduce a deadlock.

Lock or mutex: A synchronization mechanism for enforcing limits on access to a resource in an environment where there are many threads of execution. A lock is designed to enforce a mutual exclusion concurrency control policy.

Semaphore: A variable or abstract data type used to control access, by multiple processes, to a common resource in a concurrent system such as a multiprogramming operating system. Example: a variable that is changed (for example, incremented or decremented) depending on programmer-defined conditions. The variable is used as a condition to control access to system resource. Semaphores include records of how many units of a particular resource are available, coupled with operations to safely (i.e., without race conditions) adjust that record as units are required or become free, and, if necessary, wait until a unit of the resource becomes available. A mutex is essentially a binary semaphore and may use the same basic implementation. The differences between a mutex and a semaphore is in how they are used. While a binary semaphore may be used as a mutex, a mutex is a more specific use-case, in that only the process that locked the mutex is supposed to unlock it. This constraint makes it possible to implement some additional features in mutexes: Since only the process that locked the mutex is supposed to unlock it, a mutex may store the identifier of a process that locked it and verify the same process unlocks it. Mutexes may provide priority inversion safety. If the mutex knows a process which locked it and is supposed to unlock it, it is possible to promote the priority of that process whenever a higher-priority task starts waiting on the mutex. Mutexes may also provide deletion safety, where the process holding the mutex cannot be accidentally deleted. Alternately, if the process holding the mutex is deleted (perhaps due to an unrecoverable error), the mutex can be automatically released. A mutex may be recursive: a process is allowed to lock it multiple times without causing a deadlock.

Transaction Synchronization Extensions ("TSX") is an extension to the x86 instruction set architecture (ISA) that adds hardware transactional memory support, speeding up execution of multi-threaded software through lock elision. TSX requires processor support for Hardware Lock Elision ("HLE") or Restricted Transactional Memory ("RTM") (checked according to a bit value). A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution. A processor supports RTM execution if CPUID.07H.EBX.RTM [bit 11]=1. An application must check if the processor supports RTM before it uses the RTM instructions (XBEGIN, XEND, XABORT). These instructions will generate a # UD exception when used on a processor that does not support RTM. A processor supports the XTEST instruction if it supports either HLE or RTM. An application may check either of these feature flags before using the XTEST instruction. This instruction will generate a # UD exception when used on a processor that does not support either HLE or RTM.

As used herein, a process corresponds to an application executing on a processor and a thread corresponds to an instance of the process. A processor may include one or more execution core(s). The processor may be configured as one or more socket(s) that may each include one or more execution core(s).

In overview, this disclosure relates to methods and systems in a computing device apparatus to alleviate memory contention. These methods and system identify when a processor exceeds a utilization threshold; the utilization threshold may be saved or stored in, for example, computer device datastore 300 as one or more utilization threshold 320 record(s). A measured current processor utilization and utilization threshold 320 may each correspond to a respective fraction of a maximum processor utilization. The measured current processor utilization may be determined for the processor (a platform processor utilization threshold), a socket (socket processor utilization threshold) and/or a core (core processor utilization threshold). Utilization threshold 320 may be, for example, 70%. Utilization threshold 320 may be set by, for example, a system administrator, by another process, by a user, by an operating system or kernel. This may be evaluated, for example, at block 505 of transactional translation module 500.

When a processor exceeds a utilization threshold, performance monitoring data (described herein) may be determined, collected, or obtained. Performance monitoring data may be acquired relative to process(es) executing at the time the utilization threshold 320 for the processor is exceeded. Acquired performance monitoring data may be stored in, for example, computer device datastore 300 as one or more profile data 310 records. Profile data 310 records may comprise, for example, processor utilization data specific to a process and a number of instructions in a process.

A process threshold against which profile data 310 may be compared may be stored in, for example, computer device datastore 300 as one or more process threshold 305 record(s). Process threshold 305 may be, for example, 10% of total CPU cycles. Process threshold 305 may be set by, for example, a system administrator, by another process, by a user, by an operating system or kernel. Whether a process exceeds process threshold 305 may be evaluated, for example, at block 620 of FIG. 6, relating to function profiling module 600. A number of instructions in a process may be stored in, for example, computer device datastore 300 as one or more instruction threshold 315 record(s). Instruction threshold 315 may be set by, for example, a system administrator, by another process, by a user, by an operating system or kernel. Whether a process exceeds instruction threshold 315 may be evaluated, for example, at block 625 of FIG. 6, relating to function profiling module 600.

Executing processes are analyzed according to profile data 310 and a determination may be made regarding whether a process is "hot", which is to say, when the process exceeds process threshold 305. A determination may also be made regarding whether a hot process contains a loop body with assembly or machine code instructions below a threshold, which indicates that the hot process is a small, critical, code region. A determination may also be made regarding whether the hot process is lock protected. For example, the hot instruction may comprise one or more atomic instructions, such as <lock xchgl>, <lock cmpxchgl>, and <lock xadd> from x86 instruction set or another lock instruction.

By way of example, the instruction <lock xchgl> is configured to atomically exchange contents of a memory location and contents of a register. The instruction <lock cmpxchgl> ("compare and exchange (swap)", i.e., "CAS") is configured to atomically compare a first source operand in a first register and a destination operand in a memory location, replace the destination operand with a second source operand in a second source register if the first source operand and destination operand are the same and replace the first source operand with the destination operand otherwise. The instruction <lock xadd> is configured to swap a source operand and a destination operand and store the sum of the two operands in the destination operand. Other atomic lock instructions may exist or may be created in the future.

When a memory contention is identified, a critical code region of the hot process may be decoded to identify regular lock/unlock instructions. An intermediate code representation of the critical code region of the hot process may be generated with transactional/speculative lock acquire and transactional/speculative lock release instruction(s) instead of the regular lock/unlock instruction(s).

Object or machine code may be formed from the intermediate code representation and saved in appropriate locations in register(s) or stack positions, such that the modified process (the original process with modified components) is executed in place of the original process. This may also be referred to herein as binary translation. Modified process is illustrated in computer device memory 250 as one or more modified process 275 record(s). Such records may be stored in computer device datastore 300 or elsewhere in computer device memory 250. Modified process 275 may be stored in, for example, register 420, cache 425, and/or a stack, so that program flow of the process proceeds (e.g., jumps) to modified process portions. Modified process is then executed transactionally and speculatively.

The modified process may then be executed in a transactional and speculative manner, such that if the modified process can be executed without causing an error, such as a memory error, then it executes an atomic commit and changes the machine state. If execution of the modified process is determined to cause an error, then transactional execution isolates the error and the result of the modified process is ignored or aborted; the original process may be executed, with the system reverting to the original, more costly, process, without speculative execution. Experiments show percentages of aborted modified processes on the order of 1.59% or lower.

Pursuant to this disclosure, modified process may take advantage of TSX or similar processors, automatically, without requiring that a programmer re-write source code, compile to object code, etc. Thus, programmers can get the benefits of TSX enabled processors, with reduced debugging with respect to lock granularity.

Processor utilization may thus be reduced dynamically at runtime without user intervention and using techniques which take advantage of hardware modules which enable transactional and speculative execution. Processor throughput may be improved by reducing a number of memory contentions. Processor utilization and associated power consumption may be similarly reduced. A method and system consistent with the present disclosure is configured to provide such improvements without requiring access to source code and without requiring that programmers deliberately address hardware modules which enable transactional and speculative execution. The implementation is configured to be transparent to a user and may not be dependent on a priori knowledge of system workload and/or processor configuration. Overall performance may thus be improved.

FIG. 1 is a network and device diagram illustrating an example of at least one computer device 200, computer device datastore 300, and network 150, incorporated with the teachings of the present disclosure, according to some embodiments. In embodiments, computer device 200 may include a transactional translation module, a function profiling module, and a transactional execution module, of the present disclosure (to be described more fully below).

Computer device 200, except for the teachings of the present disclosure, may include, but is not limited to, a virtual reality display or supporting computers therefore, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

Also illustrated in FIG. 1 is computer device datastore 300. Computer device datastore 300 is described further, herein, though, generally, it should be understood as a datastore used by computer device 200.

Also illustrated in FIG. 1 is network 150. Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

Figure 2:
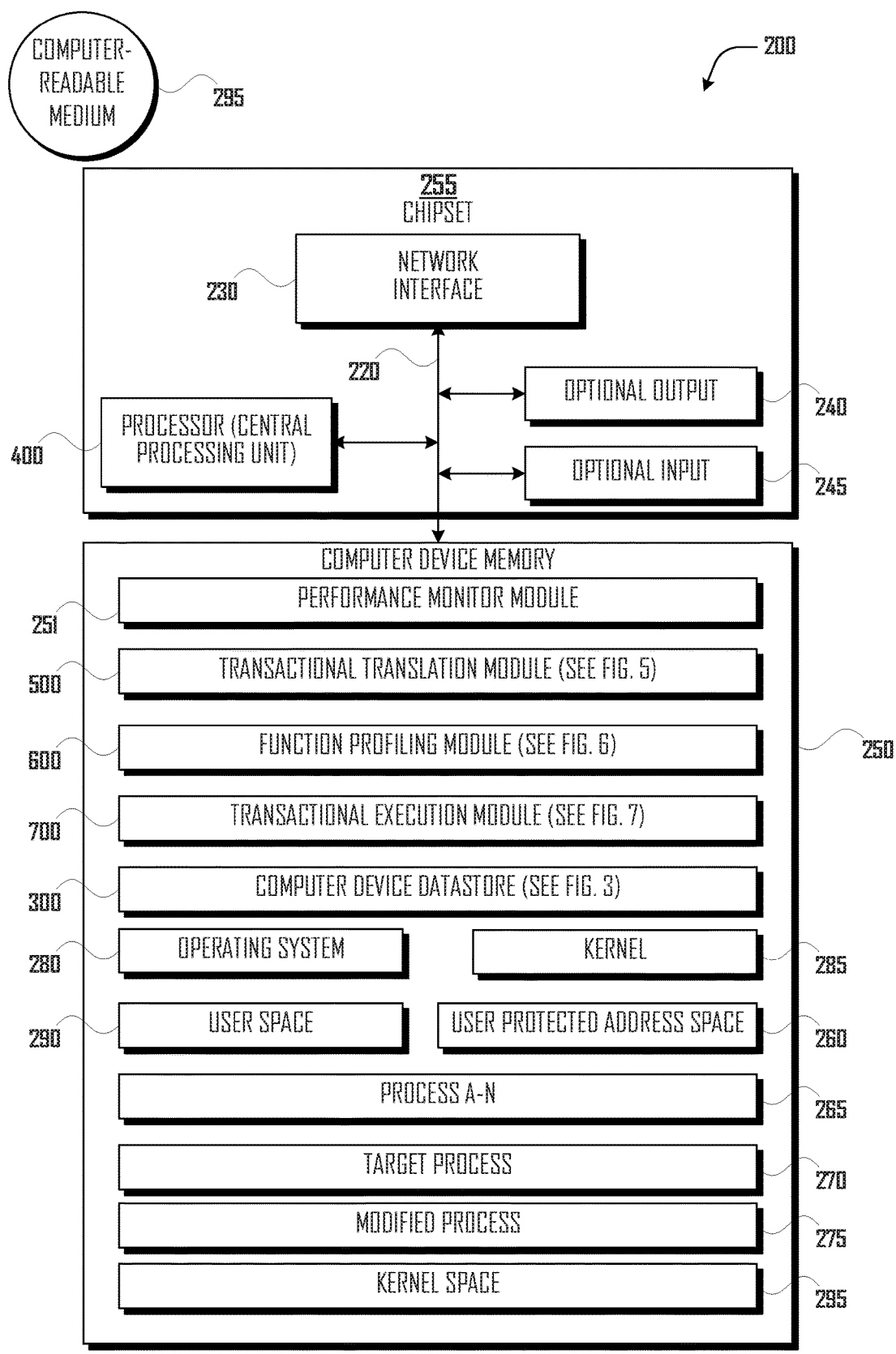
FIG. 2 is a functional block diagram illustrating an example of a computer device incorporated with teachings of the present disclosure, according to some embodiments.

FIG. 2 is a functional block diagram illustrating an example of computer device 200 incorporated with the teachings of the present disclosure, according to some embodiments. Computer device 200 may include chipset 255, comprising processor 400, input/output (I/O) port(s) and peripheral devices, such as output 240 and input 245, and network interface 230, and computer device memory 250, all interconnected via bus 220. Network Interface 230 may be utilized to form connections with Network 150, with computer device datastore 300, or to form device-to-device connections with other computers. Processor 400 is discussed and illustrated further in relation to FIG. 4.

Chipset 255 may include communication components and/or paths, e.g., buses 220, that couple processor 400 to peripheral devices, such as, for example, output 240 and input 245, which may be connected via I/O ports. For example, chipset 255 may include a peripheral controller hub (PCH). In another example, chipset 255 may include a sensors hub. Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for software modules or routines, such as, for example, transactional translation module 500 (illustrated and discussed further in relation to FIG. 5), function profiling module 600 (illustrated and discussed further in relation to FIG. 6), and transactional execution module 700 (illustrated and discussed further in relation to FIG. 7).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
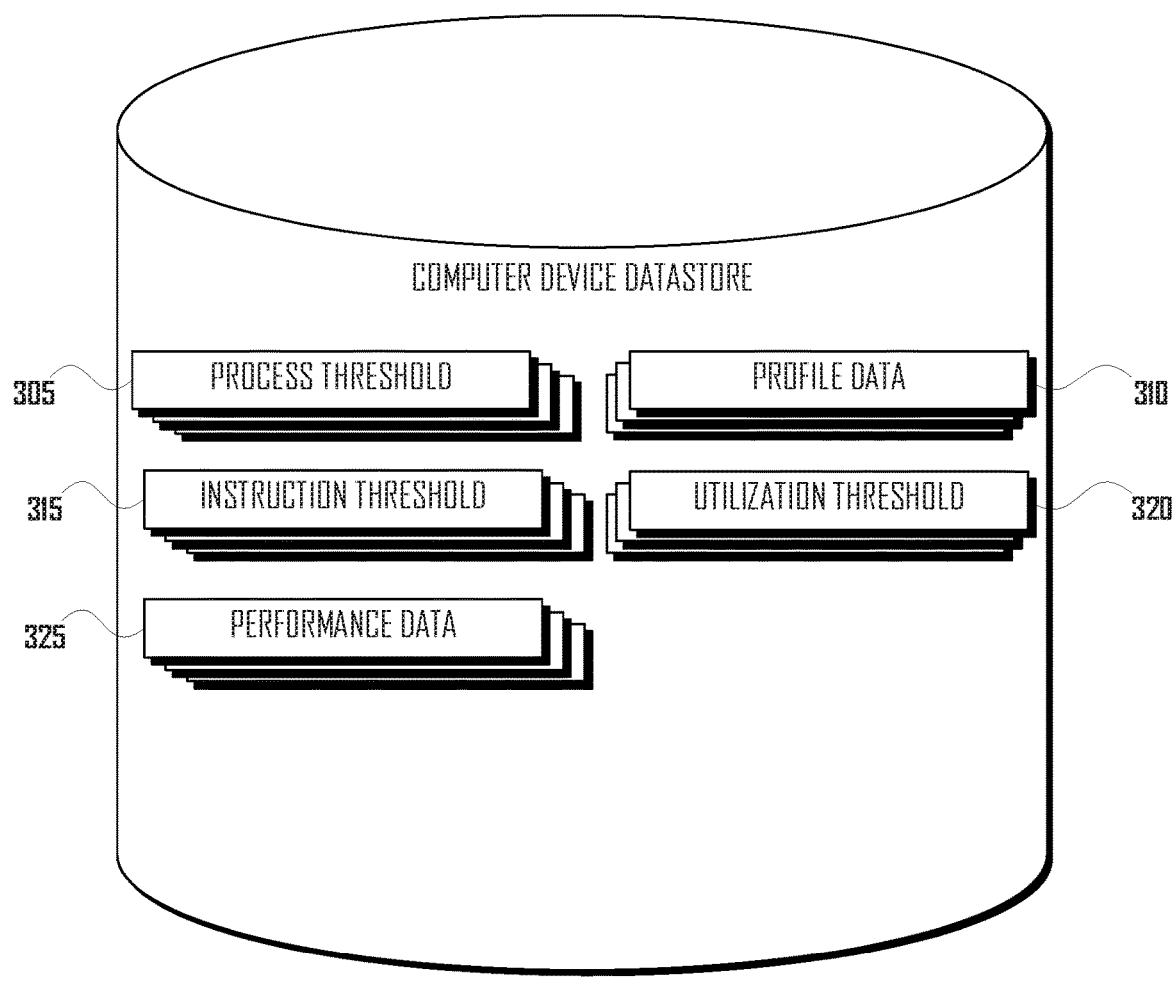
FIG. 3 is a functional block diagram illustrating an example of a computer device datastore for practicing the present disclosure, consistent with embodiments of the present disclosure.

Computer device memory 250 is also illustrated as comprising kernel 285, kernel space 295, user space 290, user protected address space 260, and computer device datastore 300 (illustrated and discussed further in relation to FIG. 3).

Computer device memory 250 may store one or more process 265 (i.e., executing software application(s)). Process 265 may be stored in user space 290. Process 265 include target process 270 and may include one or more other process 265a . . . 265n. One or more process 265 may execute generally in parallel, i.e., as a plurality of processes and/or a plurality of threads. Target process 270 corresponds to one example of an executing software application. Target process 270 may be executed as a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. Target process 270 may be unable to directly access kernel space 295. In other words, operating system 280 and/or kernel 285 may attempt to protect kernel space 295 and prevent access by target process 270 and/or other process 265a . . . 265n.

Kernel 285 may be configured to provide an interface between user processes and circuitry associated with computer device 200. In other words, kernel 285 may be configured to manage access to processor 400, chipset 255, I/O ports and peripheral devices by process 265 including target process 270. Kernel 285 may include one or more drivers configured to manage and/or communicate with elements of computer device 200 (i.e., processor 400, chipset 255, I/O ports and peripheral devices).

Computer device 200 may also comprise or communicate via Bus 220 with Support computer device datastore 300, illustrated and discussed further in relation to FIG. 3. In various embodiments, bus 220 may comprise a storage area network ("SAN"), a high speed serial bus, and/or via other suitable communication technology. In some embodiments, computer device 200 may communicate with computer device datastore 300 via network interface 230. Computer device 200 may, in some embodiments, include many more components than as illustrated. However, it is not necessary that all components be shown in order to disclose an illustrative embodiment.

FIG. 3 is a functional block diagram of the computer device datastore 300 illustrated in the computer device of FIG. 2, according to some embodiments. The components of computer device datastore 300 may include data groups used by modules and/or routines, e.g, process thresholds 305, profile data 310, instruction thresholds 315, utilization thresholds 320, and performance data 325 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The components of support computer datastore 300 are discussed further herein in the discussion of other of the Figures.

Figure 4:
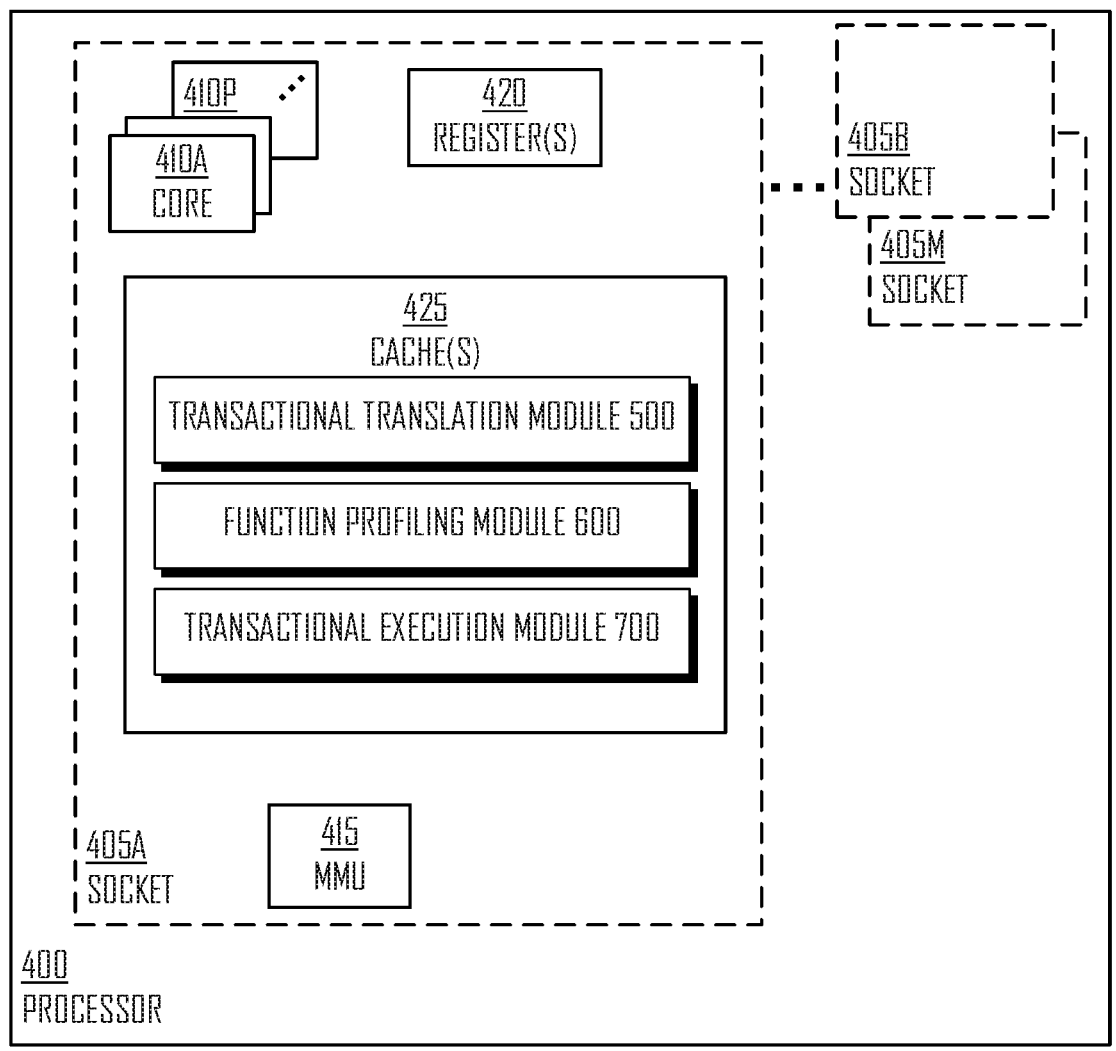
FIG. 4 is a functional block diagram illustrating an example of a processor found in computer device, consistent with embodiments of the present disclosure.

FIG. 4 is a functional block diagram illustrating an example of processor 400, consistent with embodiments of the present disclosure. As illustrated in FIG. 4, processor 400 includes one or more execution core(s) 410a, . . . , 410p, which may be central processing units ("CPUs") and/or graphics processing units ("GPUs") a plurality of registers 420 and one or more cache memor(ies) 425. Processor 400 may include a memory management unit (MMU) 415 to manage memory accesses between processor 400 and computer device memory 250. In some embodiments, processor 400 may be configured as one or more socket(s) 405a, . . . , 405m and each socket, e.g., socket 405a, may include one or more core(s) 410a, . . . , 410p, a plurality of registers 420 and one or more cache memor(ies) 425. Each core 410a, . . . , 410p may be configured to execute one or more process (es) and/or one or more thread(s). The plurality of registers 420 may include a plurality of general purpose registers, a status register and an instruction pointer. Cache(s) 425 may include one or more cache memories, which may be used to cache transactional translation module 500, function profiling module 600, and transactional execution module 700, of the present disclosure.

Figure 5:
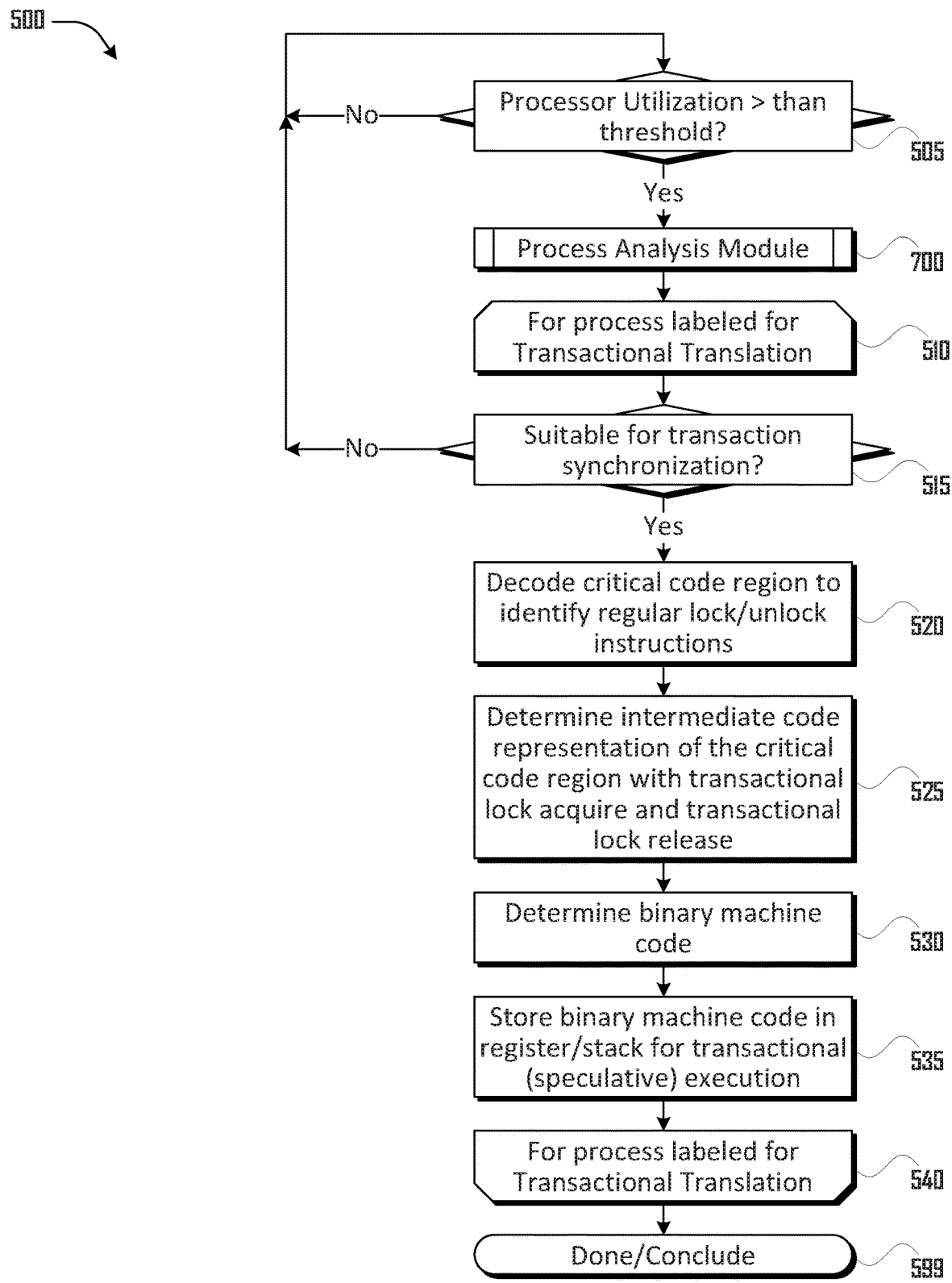
FIG. 5 is a flow diagram illustrating an example of a method performed by the transaction translation module, according to some embodiments.

FIG. 5 is a flow diagram illustrating an example of a method for a transaction translation module 500, according to some embodiments. Transaction translation module 500 may be executed by, for example, computer device 200.

At decision block 505, a determination may be made regarding whether a processor of, for example, computer device 200 has exceeded a utilization threshold, such as utilization threshold 320. Monitoring of processor utilization may be performed by, for example, performance monitor module 251.

In some embodiments, performance monitor module 251 may be included in kernel 285. Performance monitor module 251 may monitor operation of processor 400 and/or core(s) 410 and acquire performance monitoring data, which may be stored as one or more performance data 325 records. Performance monitor module 251 may associate performance data with a socket, core, process and/or thread.

For example, performance monitor module 251 may correspond to a Performance Monitor Unit (PMU) configured to implement event sampling capability within a target process, e.g., target process 270. Events may include a count of a number of processor cycles, a count of a number of instructions retired, etc. A PMU may be configured to monitor operation of a processor, e.g., processor 400, and to capture a number of processor cycles and/or a number of instructions retired in a time interval. The number of processor cycles is related to processor utilization, as described herein.

In another example, performance monitor module 251 may correspond to an application programming interface (API) configured to monitor and/or profile one or more process(es). Such APIs may include or be included in, for example, Intel® VTune® (a performance profiler), "OProfile" (an open source set of performance monitoring tools for Linux 2.6 and higher systems), "perf" (an open source profile tool for Linux 2.6 and higher), Oracle® Solaris Studio performance analysis tools, etc. Performance monitor module 251 may monitor operation of processor 400.

Utilization threshold 320 may correspond to a total utilization of processor 400 as a percentage of maximum allowable utilization of processor 400. Utilization threshold 320 may include contributions from all of the associated processing units (e.g., socket(s) and/or core(s)). Utilization threshold 320 may be set by a user, e.g., a system administrator, generally prior to runtime. For example, utilization threshold 320 may be in the range of 70% to 100%. In one example, utilization threshold 320 may be 70%.

If, at decision block 505, transaction translation module 500 determines that the processor has not exceeded utilization threshold 320, then transaction translation module 500 may return to block 505.

If affirmative at decision block 505, then at block 600, transaction translation module 500 may analyze processes which are then being executed by processor 400, referred to herein as target process, such as target process 270. Analyzing target process 270 may be performed by calling function profiling module 600, whether as a subroutine or sub-module, or by calling or referring to records created by function profiling module 600 or a module similar thereto. Function profiling module 600 is illustrated and discussed further in relation to FIG. 6.

Opening loop block 510 to closing loop block 540 may iterate for processes labeled for transactional translation.

At decision block 515, transaction translation module 500 may determine whether the then-current process is suitable for transaction synchronization, such as TSX. Not all processes may be suitable for transaction synchronization. For example, for Intel Architecture processors, some instructions, such as CPUID and PAUSE, may abort transactional execution in any implementation. In addition, in some implements, the following Intel Architecture instructions may cause transactional aborts: i) Operations on X87 and MMX architecture state (this may include all MMX and X87 instructions, including the FXRSTOR and FXSAVE instructions); ii) Update to non-status portion of EFLAGS: CLI, STI, POPFD, POPFQ; iii) Instructions that update segment registers, debug registers and/or control registers, such as MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8, CLTS and LMSW; iv) Ring transitions such as SYSENTER, SYSCALL, SYSEXIT, and SYSRET; v) TLB and Cacheability control such as CLFLUSH, CLFLUSHOPT, INVD, WBINVD, INVLPG, INVPCID, and memory instructions with a non-temporal hint (V/MOVNTDQA, V/MOVNTDQ, V/MOVNTI, V/MOVNTPD, V/MOVNTPS, V/MOVNTQ, V/MASKMOVQ, and V/MASKMOVDQU); Processor state saves such as XSAVE, XSAVEOPT, and XRSTOR; Interrupts such as INTn, INTO; IO such as IN, INS, REP INS, OUT, OUTS, REP OUTS and their variants; VMX such as VMPTRLD, VMPTRST, VMCLEAR, VMREAD, VMWRITE, VMCALL, VMLAUNCH, VMRESUME, VMXOFF, VMXON, INVEPT, INVVPID, and VMFUNC; SMX such as GETSEC; and UD2, RSM, RDMSR, WRMSR, HLT, MONITOR, MWAIT, XSETBV, VZEROUPPER, MASKMOVQ, and V/MASKMOVDQU.

If, at decision block 515, transaction translation module 500 determines that then-current process is not suitable for transaction synchronization, such as TSX, then transaction translation module 500 may return to block 505.

If affirmative at decision block 515, then at block 520, transaction translation module 500 may decode a critical code region of the then-current process to identify regular (not transactional) lock/unlock instructions. This may be performed by a decoder which may be aided by, for example last branch records or branch trace buffer records.

At block 525, transaction translation module 500 may determine an intermediate code representation of the decoded critical code region of the then-current process. In doing so, transaction translation module 500 may include transactional lock acquire and transactional lock release instructions in place of regular lock/release instructions. These may be, for example, instructions with certain operand prefixes, such as F2 and F3 operand prefixes in Intel Architecture, which may be ignored by processor hardware which does not support transaction synchronization.

For example, when using HLE, the modified process 275 produced by decoding critical code region of the then-current process may be similar to process 265, except that the lock/unlock instructions may have been modified by binary translation to have transactional prefixes. As discussed further herein, in an embodiment, a first execution of modified process 275 may be speculative (the number of speculative execution attempts is a system parameter which may be varied). If the speculative execution fails, then hardware in processor 400 automatically ignores the transaction prefixes in the translated code in modified process 275. Therefore, the translated code will behave like the original code.

For example, when using RTM, modified process 275 may comprise either of: (a) two paths, i.e. a speculative execution path and the regular lock/unlock path, which may be identical or similar to the original code; or (b); a speculative execution path only. In the case of (a), on failure of the speculative execution path, the regular path may be followed. In the case of (b), failure of the speculative execution path may result in an error.

Other variations on transactional translation may be followed; the foregoing are examples.

For example, following is a pseudo-code for a process in which legacy lock/unlock instructions are found, which legacy lock/unlock instructions are indicated by leading "****" symbols.

```
< ReadersWriterLock::AcquireReadOrWait( ) >:
0008f900 <_ZN19 ReadersWriterLock17AcquireReadOrWaitEbRi>:
8f900: 55 push %ebp
8f901: 89 e5 mov %esp,%ebp
8f903: 57 push %edi
8f904: 56 push %esi
8f905: 53 push %ebx
8f906: 83 ec 1c sub $0x1c,%esp
8f909: 8b 75 08 mov 0x8(%ebp),%esi
8f90c: 0f b6 45 0c movzbl 0xc(%ebp),%eax
8f910: e8 29 ad fa ff call 3a63e < i686.get_pc_thunk.bx>
8f915: 81 c3 7f cb 07 00 add $0x7cb7f,%ebx
8f91b: 8b 7d 10 mov 0x10(%ebp),%edi
8f91e: 8b 8e 88 02 00 00 mov 0x288(%esi),%ecx
8f924: 88 45 f3 mov %al,0xfffffff3(%ebp)
8f927: eb 27 jmp 8f950
<_ZN19 ReadersWriterLock17AcquireReadOrWaitEbRi+0x50>
8f929: 8d b4 26 00 00 00 00 lea 0x0(%esi),%esi
8f930: c6 45 f2 00 movb $0x0,0xfffffff2(%ebp)
8f934: 89 ca mov %ecx,%edx
8f936: 81 ca 00 00 00 20 or $0x20000000,%edx
8f93c: 39 d1 cmp %edx,%ecx
8f93e: 74 3f je 8f97f
<_ZN19 ReadersWriterLock17AcquireReadOrWaitEbRi+0x7f>
8f940: 89 c8 mov %ecx,%eax
****8f942: f0 0f b1 96 88 02 00 lock cmpxchg %edx,0x288(%esi)
8f949: 00
< ReadersWriterLock::AcquireWriteOrWait( ) >:
0008cd20 <_ZN19 ReadersWriterLock18AcquireWriteOrWaitEb>:
8cd20: 55 push %ebp
8cd21: 89 e5 mov %esp,%ebp
8cd23: 56 push %esi
8cd24: 83 ec 04 sub $0x4,%esp
8cd27: 8b 75 08 mov 0x8(%ebp),%esi
8cd2a: 0f b6 45 0c movzbl 0xc(%ebp),%eax
8cd2e: 8b 8e 88 02 00 00 mov 0x288(%esi),%ecx
8cd34: 88 45 fb mov %al,0xfffffffb(%ebp)
8cd37: eb 27 jmp 8cd60
<_ZN19 ReadersWriterLock18AcquireWriteOrWaitEb+0x40>
8cd39: 8d b4 26 00 00 00 00 lea 0x0(%esi),%esi
8cd40: c6 45 fa 00 movb $0x0,0xfffffffa(%ebp)
8cd44: 89 ca mov %ecx,%edx
8cd46: 81 ca 00 00 00 40 or $0x40000000,%edx
8cd4c: 39 d1 cmp %edx,%ecx
8cd4e: 74 34 je 8cd84
<_ZN19 ReadersWriterLock18AcquireWriteOrWaitEb+0x64>
8cd50: 89 c8 mov %ecx,%eax
***8cd52: f0 0f b1 96 88 02 00 lock cmpxchg %edx,0x288(%esi)
8cd59: 00
```

A corresponding release-lock function can be traced down as follows:

```
< ReadersWriterLock::Release( ) >:
0008eb60 <_ZN19 ReadersWriterLock7ReleaseEv>:
8eb60: 55 push %ebp
8eb61: 89 e5 mov %esp,%ebp
8eb63: 8d 55 d8 lea 0xffffffd8(%ebp),%edx
8eb66: 57 push %edi
8eb67: 56 push %esi
8eb68: 53 push %ebx
8eb69: 83 ec 5c sub $0x5c,%esp
8eb6c: 8b 45 08 mov 0x8(%ebp),%eax
8eb6f: e8 ca ba fa ff call 3a63e < i686.get_pc_thunk.bx>
8eb74: 81 c3 20 d9 07 00 add $0x7d920,%ebx
8eb7a: 89 55 c4 mov %edx,0xffffffc4(%ebp)
8eb7d: 89 45 d4 mov %eax,0xffffffd4(%ebp)
8eb80: 89 44 24 04 mov %eax,0x4(%esp)
8eb84: 89 14 24 mov %edx,(%esp)
8eb87: e8 fc 60 fa ff call 34c88
<_ZN19 ReadersWriterLock11WakeupGuardC1ERS_@plt>
8eb8c: 8b 4d d4 mov 0xffffffd4(%ebp),%ecx
8eb8f: 8b 55 d4 mov 0xffffffd4(%ebp),%edx
8eb92: 8b 81 94 02 00 00 mov 0x294(%ecx),%eax
8eb98: 81 f2 23 33 0a cf xor $0xcf0a3323,%edx
8eb9e: 39 d0 cmp %edx,%eax
8eba0: 74 25 je 8ebc7 <_ZN19 ReadersWriterLock7ReleaseEv+0x67>
8eba2: 89 0c 24 mov %ecx,(%esp)
8eba5: 8d 83 2d 14 fd ff lea 0xfffd142d(%ebx),%eax
8ebab: 89 44 24 0c mov %eax,0xc(%esp)
8ebaf: b8 29 01 00 00 mov $0x129,%eax
8ebb4: 89 44 24 08 mov %eax,0x8(%esp)
8ebb8: 8d 83 d8 31 fd ff lea 0xfffd31d8(%ebx),%eax
8ebbe: 89 44 24 04 mov %eax,0x4(%esp)
8ebc2: e8 41 59 fa ff call 34508
<_ZN19 ReadersWriterLock18DoCheckInitializedEPKciS1_@plt>
8ebc7: 8b 45 d4 mov 0xffffffd4(%ebp),%eax
8ebca: 8d 93 2d 14 fd ff lea 0xfffd142d(%ebx),%edx
8ebd0: 8d 8b d8 31 fd ff lea 0xfffd31d8(%ebx),%ecx
8ebd6: 89 55 cc mov %edx,0xffffffcc(%ebp)
8ebd9: 8b b0 88 02 00 00 mov 0x288(%eax),%esi
8ebdf: 89 4d c8 mov %ecx,0xffffffc8(%ebp)
8ebe2: f7 c6 ff ff ff 1f test $0x1fffffff,%esi
8ebe8: 74 34 je 8ecle <_ZN19 ReadersWriterLock7ReleaseEv+0xbe>
8ebea: 8d b6 00 00 00 00 lea 0x0(%esi),%esi
8ebf0: c6 45 d2 00 movb $0x0,0xffffffd2(%ebp)
8ebf4: 8d 7e ff lea 0xffffffff(%esi),%edi
8ebf7: f7 c7 ff ff ff 1f test $0x1fffffff,%edi
8ebfd: 0f 94 45 d3 sete 0xffffffd3(%ebp)
8ec01: 89 f0 mov %esi,%eax
8ec03: 89 fa mov %edi,%edx
8ec05: 8b 4d d4 mov 0xffffffd4(%ebp),%ecx
****8ec08: f0 0f b1 91 88 02 00 lock cmpxchg %edx,0x288(%ecx)
8ec0f: 00
```

The foregoing may be re-written as follows, with transactional lock/unlock instructions identified by leading "****" symbols.

```
< ReadersWriterLock::AcquireReadOrWait( ) >:
0008f910 <ZN19ReadersWriterLock17AcquireReadOrWaitEbRi>:
8f910: 55 push %ebp
8f911: 89 e5 mov %esp,%ebp
8f913: 57 push %edi
8f914: 56 push %esi
8f915: 53 push %eb x
8f916: 83 ec 1c sub $0x1c,%esp
8f919: 8b 75 08 mov 0x8(%ebp),%esi
8f91c: 0f b6 45 0c movzbl 0xc(%ebp),%eax
8f920: e8 df 60 fa ff call 35a04 <_i686.get_pc_thunk.bx>
8f925: 81 c3 53 7c 07 00 add $0x77c53,%ebx
8f92b: 8b 7d 10 mov 0x10(%ebp),%edi
8f92e: 8b 8e 88 02 00 00 mov 0x288(%esi),%ecx
8f934: 88 45 f3 mov %al,0xfffffff3(%ebp)
8f937: eb 28 jmp 8f961
<_ZN19ReadersWriterLock17AcquireReadOrWaitEbRi+0x51>
8f939: 8d b4 26 00 00 00 00 lea 0x0(%esi),%esi
8f940: c6 45 f2 00 mov b $0x0,0xfffffff2(%ebp)
8f944: 89 ca mov %ecx,%edx
8f946: 81 ca 00 00 00 20 or $0x20000000,%edx
8f94c: 39 d1 cmp %edx,%ecx
8f94e: 74 40 je 8f990
<_ZN19ReadersWriterLock17AcquireReadOrWaitEbRi+0x80>
```

-continued

```
8f950: 89 c8 mov %ecx,%eax
****8f952: f2 f0 0f b1 96 88 02 repnz lock cmpxchg %edx,0x288(%esi)
8f959: 00 00
<ReadersWriterLock::AcquireWriteOrWait(bool)>:
0008cdf0 <_ZN19ReadersWriterLock18AcquireWriteOrWaitEb>:
8cdf0: 55 push %ebp
8cdf1: 89 e5 mov %esp,%ebp
8cdf3: 56 push %esi
8cdf4: 83 ec 04 sub $0x4,%esp
8cdf7: 8b 75 08 mov 0x8(%ebp),%esi
8cdfa: 0f b6 45 0c movzbl 0xc(%ebp),%eax
8cdfe: 8b 8e 88 02 00 00 mov 0x288(%esi),%ecx
8ce04: 88 45 fb mov %al,0xfffffffb(%ebp)
8ce07: eb 28 jmp 8ce31
<_ZN19ReadersWriterLock18AcquireWriteOrWaitEb+0x41 >
8ce09: 8d b4 26 00 00 00 00 lea 0x0(%esi),%esi
8ce10: c6 45 fa 00 movb $0x0,0xfffffffa(%ebp)
8ce14: 89 ca mov %ecx,%edx
8ce16: 81 ca 00 00 00 40 or $0x40000000,%edx
8ce1c: 39 d1 cmp %edx,%ecx
8ce1e: 74 35 je 8ce55
<_ZN19ReadersWriterLock18AcquireWriteOrWaitEb+0x65>
8ce20: 89 c8 mov %ecx,%eax
****8ce22: f2 f0 0f b1 96 88 02 repnz lock cmpxchg %edx,0x288(%esi)
8ce29: 00 00
<ReadersWriterLock::Release( ) >:
0008ebc0 <_ZN19 ReadersWriterLock7ReleaseEv>:
8ebc0: 55 push %ebp
8ebc1: 89 e5 mov %esp,%ebp
8ebc3: 57 push %edi
8ebc4: 8d 7d d8 lea 0xffffffd8(%ebp),%edi
8ebc7: 56 push %esi
8ebc8: 53 push %ebx
8ebc9: 83 ec 5c sub $0x5c,%esp
8ebcc: 8b 75 08 mov 0x8(%ebp),%esi
8ebcf: e8 30 6e fa ff call 35a04 < i686.get_pc_thunk.bx>
8ebd4: 81 c3 a4 89 07 00 add $0x789a4,%ebx
8ebda: 89 3c 24 mov %edi,(%esp)
8ebdd: 89 74 24 04 mov %esi,0x4(%esp)
8ebe1: e8 72 68 fa ff call 35458
<_ZN19 ReadersWriterLock11WakeupGuardC1ERS_@plt>
8ebe6: 8b 86 94 02 00 00 mov 0x294(%esi),%eax
8ebec: 89 f2 mov %esi,%edx
8ebee: 81 f2 23 33 0a cf xor $0xcf0a3323,%edx
8ebf4: 39 d0 cmp %edx,%eax
8ebf6: 74 25 je 8ec1d <_ZN19 ReadersWriterLock7ReleaseEv+0x5d>
8ebf8: 89 34 24 mov %esi,(%esp)
8ebfb: 8d 83 89 57 fd ff lea 0xfffd5789(%ebx),%eax
8ec01: 89 44 24 0c mov %eax,0xc(%esp)
8ec05: b8 3b 01 00 00 mov $0x13b,%eax
8ec0a: 89 44 24 08 mov %eax,0x8(%esp)
8ec0e: 8d 83 34 75 fd ff lea 0xfffd7534(%ebx),%eax
8ec14: 89 44 24 04 mov %eax,0x4(%esp)
ec18: e8 bb 60 fa ff call 34cd8
<_ZN19 ReadersWriterLock18DoCheckInitializedEPKciS1_@plt>
8ec1d: 8b 86 88 02 00 00 mov 0x288(%esi),%eax
8ec23: 8d 93 34 75 fd ff lea 0xfffd7534(%ebx),%edx
8ec29: 89 55 d0 mov %edx,0xffffffd0(%ebp)
8ec2c: 89 45 c4 mov %eax,0xffffffc4(%ebp)
8ec2f: eb 25 jmp 8ec56 <_ZN19 ReadersWriterLock7ReleaseEv+0x96>
8ec31: c6 45 d7 00 movb $0x0,0xffffffd7(%ebp)
8ec35: 8b 55 c4 mov 0xffffffc4(%ebp),%edx
8ec38: 4a dec %edx
8ec39: f7 c2 ff ff ff 1f test $0x1fffffff,%edx
8ec3f: 0f 94 c1 sete %cl
8ec42: 8b 45 c4 mov 0xffffffc4(%ebp),%eax
****8ec45: f3 f0 0f b1 96 88 02 repz lock cmpxchg %edx,0x288(%esi)
8ec4c: 00 00
```

At block 530, binary machine code corresponding to the intermediate code representation of block 520 may be prepared.

At block 535, the binary machine code may be stored in replacement of the original code image for the then-current process. This may be performed so as not affect correctness of execution of the process in a multi-processor setting, so that program flow proceeds (e.g., jumps) to the modified process portion(s) 275 and does not execute the unmodified process portions. This may be performed by extending the modified process to an earlier instruction that sits right on the cache-line boundary so the modification can be done atomically. If such an instruction cannot be found, other techniques may be used such as such as writing a one-byte self-looping branch instruction to replace the first byte of the to-be-modify instruction (with sufficient length) before changing the following bytes.

At closing loop block 540, transaction translation module 500 may return to iterate over another process labeled for transactional translation, if any.

At done block 599, transaction translation module 500 may conclude, may return to decision block 505, or may return to a process which spawned it.

Figure 6:
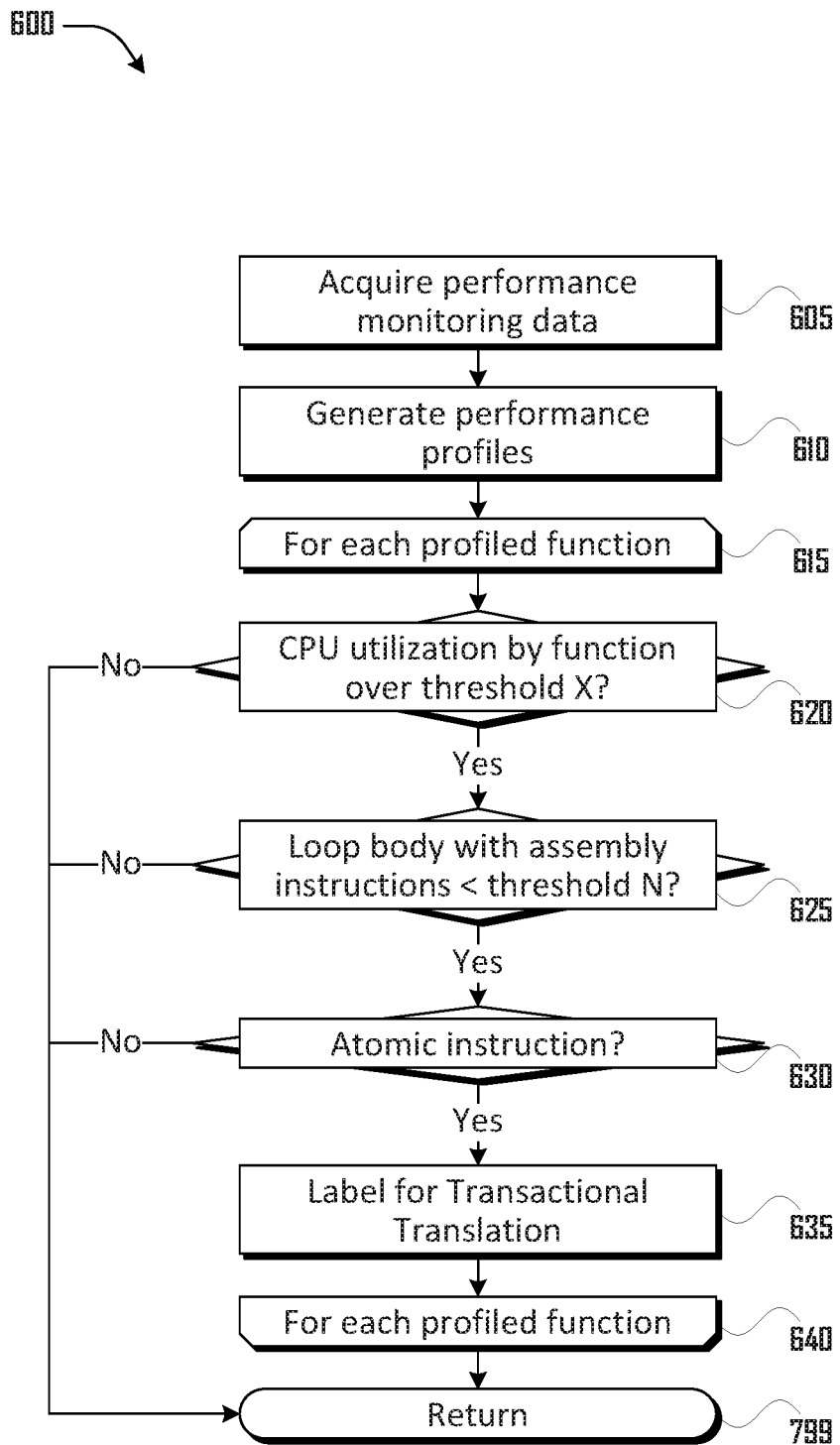
FIG. 6 is a flow diagram illustrating an example of a method performed by the function profiling module, according to some embodiments.

FIG. 6 is a flow diagram illustrating an example of a method performed by function profiling module 600, according to some embodiments. Function profiling module 600 may be performed by, for example, computer device 200. Function profiling module 600 may utilize functions of performance monitor module 251. Function profiling module 600 may be executed relative to target processes 270.

At block 605, function profiling module 600 may acquire performance monitoring data, such as from performance data 325 records.

At block 610, function profiling module 600 may generate performance profile(s). Generating performance profile(s) may include relating the performance data 325 to a target process.

Opening loop block 615 to closing loop block may iterate for each profiled function or target process 270.

At decision block 620, function profiling module 600 may determine whether the then-current target process 270 consumes greater than a threshold of CPU utilization for a process, such as according to one or more process threshold 305 records. For example, a process threshold 305 record may define a threshold of 10% of total CPU cycles. As discussed in relation to performance monitor module 251, this may performed by event sampling e.g., by a PMU inside the target process and/or by utilizing a profiling tool API.

If affirmative at decision block 620, at decision block 625, function profiling module 600 may determine whether target process 270 comprises assembly instructions, for example, assembly instructions comprising a loop body, that are fewer than a threshold such as, for example, instruction threshold 315.

If affirmative at decision block 625, at decision block 630, function profiling module 600 may determine if target process 270 comprises one or more atomic instruction(s), such as, for example, <lock xchgl>, <lock cmpxchgl>, and <lock xadd> from the x86 instruction set.

If affirmative at decision block 620, may label target process 270 for transactional translation.

At closing loop block 640, function profiling module 600 may return to opening loop block 615 to iterate over the next target process 270, if any.

If negative at decision blocks 620, 625, and/or 630, function profiling module 600 may proceed to done block 799.

At done block 799, function profiling module 600 may return to a process which spawned it and/or may conclude.

Figure 7:
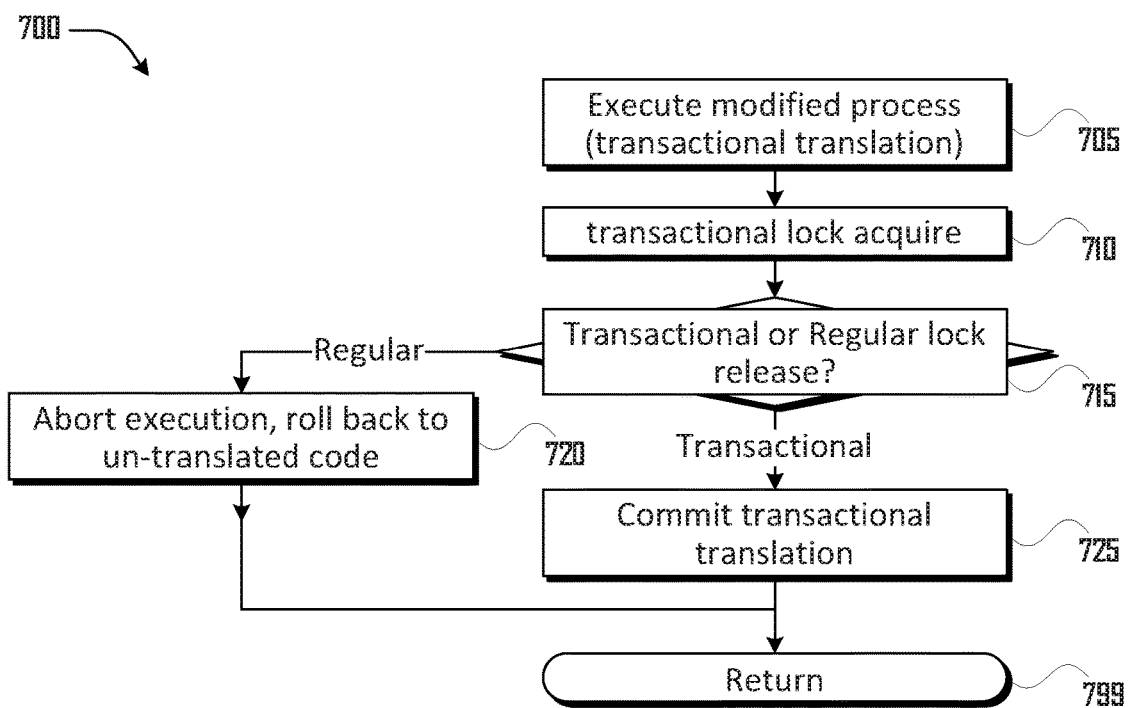
FIG. 7 is a flow diagram illustrating an example of a method performed by the transactional execution module, according to some embodiments.

FIG. 7 is a flow diagram illustrating an example of a method which may be performed by, for example, transactional execution module 700, according to some embodiments.

At bock 705, transactional execution module 700 may execute modified process 275. At block 710, transactional execution module 700 may execute transactional lock acquire in modified process 275.

At decision block 715, transactional execution module 700 may determine whether a transactional or a regular lock release is caused by execution of modified process 275. If transactional, then at block 725, transactional execution module 700 may commit the transactional translation of modified process 275. If regular at decision block 715, then transactional execution module 700 may abort execution of modified process 275 and roll back to un-translated code.

For example, when using HLE, the modified process 275 is similar to process 265, except that the lock/unlock instructions may have been modified by binary translation to have transactional prefixes. In an embodiment, a first execution may be speculative (the number of speculative execution attempts is a system parameter which may be varied). If the speculative execution fails, then hardware in processor 400 automatically ignores the transaction prefixes in the translated code in modified process 275. Therefore, the translated code will behave like the original code.

For example, when using RTM, modified process 275 may comprise either of: (a) two paths, i.e. a speculative execution path and the regular lock/unlock path, which may be identical or similar to the original code; or (b); a speculative execution path only. In the case of (a), on failure of the speculative execution path, the regular path may be followed. In the case of (b), failure of the speculative execution path may result in an error.

Other variations on transactional execution may be followed; the foregoing are examples.

At done block 799, transactional execution module 700 may conclude, return, or return to a process which may have spawned it.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1

An apparatus for computing, comprising: a computer processor and a memory; and a transactional translation module to manage a memory utilization with respect to a process, wherein to manage the memory utilization with respect to the process, the transactional translation module is to identify a memory contention with respect to the process, re-write the process to form a transactional process, and execute the transactional process in a speculative execution.

Example 2

The apparatus according to Example 1, further comprising a process analysis module to identify the memory contention with respect to the process, wherein to identify the memory contention with respect to the process, the process analysis module is to obtain a performance data with respect to the process and determine if the performance data is consistent with the memory contention.

Example 3

The apparatus according to Example 2, wherein the performance data is obtained from at least one of a performance monitor module in the processor or a profiling module of the apparatus.

Example 4

The apparatus according to Example 2, wherein the performance data is annotated to mark events belonging to at least one of a socket of the apparatus, a core of the computer processor, or a thread of the computer processor.

Example 5

The apparatus according to Example 2, wherein the process analysis module is to determine if the performance data is consistent with the memory contention according to whether the process exceeds a central processing unit process utilization threshold for the computer processor.

Example 6

The apparatus according to Example 5, wherein the process analysis module is to determine if the performance data is consistent with the memory contention further according to at least one of a determination that the process comprises a loop body with assembly or machine instructions greater than an assembly or machine instruction threshold or a determination that the process comprises an atomic instruction or an atomic group of instructions.

Example 7

The apparatus according to Example 1, wherein the transactional translation module is to identify the memory contention with respect to the process by determining if the a core of the processor exceeds a processor utilization threshold when the process is executed by the core.

Example 8

The apparatus according to Example 1, wherein transactional translation module is to determine whether the transactional process may be executed by a hardware-based transactional execution process.

Example 9

The apparatus according to Example 8, wherein the hardware-based transactional execution process comprises a lock elision.

Example 10

The apparatus according to Example 9, wherein the lock elision comprises at least one of a hardware lock elision or a restricted transactional memory.

Example 11

The apparatus according to any one of Example 1 to Example 10, wherein to re-write the process to form the transactional process comprises to decode a critical code region of the process, identify regular lock/unlock instructions in the critical code region, determine a code representation of the critical code region, wherein the code representation of the critical code region comprises a transactional lock acquire and a transactional lock release, determine a binary machine code corresponding to the code representation of the critical code region as the transactional process, and store the transactional process in at least one of a register or a stack of the computer processor for execution.

Example 12

The apparatus according to any one of Example 1 to Example 10, wherein the speculative execution results in one of an atomic commit with respect to the transactional process or ignoring the result of the transactional process.

Example 13

A computer implemented method, comprising: identifying by a computer processor, a memory contention with respect to a process of the computer processor; re-writing, by the computer processor, the process to form a transactional process; and executing, by the computer processor, the transactional process in a speculative execution.

Example 14

The method according to Example 13, wherein identifying a memory contention with respect to the process further comprises obtaining a performance data with respect to the process and determining if the performance data is consistent with the memory contention.

Example 15

The method according to Example 14, further comprising obtaining the performance data from at least one of a performance monitor module in the processor or a profiling module of the processor.

Example 16

The method according to Example 14, wherein determining if the performance data is consistent with the memory contention comprises determining if a central processing unit process utilization threshold is exceeded when the process is executed.

Example 17

The method according to Example 16, wherein determining if the performance data is consistent with the memory contention further comprises at least one of determining that the process comprises a loop body with assembly or machine instructions greater than an assembly instruction threshold or determining that the process comprises an atomic instruction or an atomic group of instructions.

Example 18

The method according to Example 13, further comprising determining whether the transactional process may be executed by a hardware-based transactional execution process.

Example 19

The method according to Example 18, wherein the hardware-based transactional execution process comprises a lock elision.

Example 20

The method according to Example 19, wherein the lock elision comprises at least one of a hardware lock elision or a restricted transactional memory.

Example 21

The method according to any one of Example 13 to Example 20, wherein re-writing the process to form the transactional process comprises decoding a critical code region of the process, identifying regular lock/unlock instructions in the critical code region, determining a code representation of the critical code region, wherein the code representation of the critical code region comprises a transactional lock acquire and a transactional lock release, determining a binary machine code corresponding to the code representation of the critical code region as the transactional process, and storing the transactional process in at least one of a register or a stack of the computer processor for execution.

Example 22

The method according to any one of Example 13 to Example 20, wherein the speculative execution results in one of an atomic commit with respect to the transactional process or ignoring the result of the transactional process.

Example 23

An apparatus for computing, comprising: means to identify a memory contention with the apparatus with respect to a process of the apparatus; means to re-write the process to form a transactional process of the apparatus; and means to execute the transactional process in a speculative execution of the apparatus.

Example 24

The apparatus according to Example 23, wherein means to identify the memory contention with respect to the process comprises means to obtain a performance data with respect to the process and means to determine if the performance data is consistent with the memory contention.

Example 25

The apparatus according to Example 24, wherein the means to obtain the performance data with respect to the process comprises means to obtain the performance data from at least one of a performance monitor module in the processor or a profiling module of the apparatus.

Example 26

The apparatus according to Example 24, wherein means to determine if the performance data is consistent with the memory contention comprises means to determine if a central processing unit process utilization threshold for the apparatus is exceeded when the process is executed.

Example 27

The apparatus according to Example 26, wherein means to determine if the performance data is consistent with the memory contention further comprises means to determine at least one of whether the process comprises a loop body with assembly or machine instructions greater than an assembly or machine instruction threshold or whether the process comprises an atomic instruction or an atomic group of instructions.

Example 28

The apparatus according to Example 23, further comprising means to determine whether the transactional process may be executed by a hardware-based transactional execution process.

Example 29

The apparatus according to Example 28, wherein the hardware-based transactional execution process comprises a lock elision.

Example 30

The apparatus according to Example 29, wherein the lock elision comprises at least one of a hardware lock elision or a restricted transactional memory.

Example 31

The apparatus according to any one of Example 23 to Example 30, wherein means to re-write the process to form the transactional process comprises means to decode a critical code region of the process, identify regular lock/unlock instructions in the critical code region, determine a code representation of the critical code region, wherein the code representation of the critical code region comprises a transactional lock acquire and a transactional lock release, determine a binary machine code corresponding to the code representation of the critical code region as the transactional process, and means to store the transactional process in at least one of a register or a stack of the apparatus for execution.

Example 32

The apparatus according to any one of Example 23 to Example 30, wherein the speculative execution results in one of an atomic commit with respect to the transactional process or ignoring the result of the transactional process.

Example 33

One or more computer-readable media comprising instructions that cause a computer device, in response to execution of the instructions by a processor of the computer device, to: Identify, by the computer device, a memory contention with respect to a process of the computer device; re-write the process, by the computer device, to form a transactional process of the computer device; and execute the transactional process in a speculative execution by the computer device.

Example 34

The computer-readable media according to Example 33, wherein identify the memory contention with respect to the process further comprises obtain a performance data with respect to the process and determine if the performance data is consistent with the memory contention.

Example 35

The computer-readable media according to Example 34, further comprising obtain the performance data from at least one of a performance monitor module in the processor or a profiling module of the computer device.

Example 36

The computer-readable media according to Example 34, wherein determine if the performance data is consistent with the memory contention comprises determine if a central processing unit process utilization threshold for the processor is exceeded when the process is executed.

Example 37

The computer-readable media according to Example 36, wherein determine if the performance data is consistent with the memory contention further comprises at least one of determine that the process comprises a loop body with assembly or machine instructions greater than an assembly or machine instruction threshold or determine that the process comprises an atomic instruction or an atomic group of instructions.

Example 38

The computer-readable media according to Example 33, further comprising determine whether the transactional process may be executed by a hardware-based transactional execution process.

Example 39

The computer-readable media according to Example 38, wherein the hardware-based transactional execution process comprises a lock elision.

Example 40

The computer-readable media according to Example 39, wherein the lock elision comprises at least one of a hardware lock elision or a restricted transactional memory.

Example 41

The computer-readable media according to any one of Example 33 to Example 40, wherein re-write the process to form the transactional process comprises decode a critical code region of the process, identify regular lock/unlock instruction in the critical code region, determine a code representation of the critical code region, wherein the code representation of the critical code region comprises a transactional lock acquire and a transactional lock release, determine a binary machine code corresponding to the code representation of the critical code region as the transactional process, and store the transactional process in at least one of a register or a stack of the computer device for execution.

Example 42

The computer-readable media according to any one of Example 33 to Example 40, wherein the speculative execution results in one of an atomic commit with respect to the transactional process or ignoring the result of the transactional process.

The invention claimed is:
1. An apparatus for computing, comprising:
a computer processor and a memory; and
a transactional translation module operated by the computer processor to manage a memory utilization with respect to a process of the apparatus, wherein to manage the memory utilization with respect to the process, the transactional translation module is to identify a memory contention with respect to the process, re-write the process to form a transactional process, and execute the transactional process in a speculative execution.

2. The apparatus according to claim 1, further comprising a process analysis module operated by the computer processor to identify the memory contention with respect to the process, wherein to identify the memory contention with respect to the process, the process analysis module is to obtain a performance data with respect to the process and determine if the performance data is consistent with the memory contention.

3. The apparatus according to claim 2, wherein the process analysis module is to determine if the performance data is consistent with the memory contention according to whether the process exceeds a central processing unit process utilization threshold for the computer processor.

4. The apparatus according to claim 3, wherein the process analysis module is to determine if the performance data is consistent with the memory contention further according to at least one of a determination that the process comprises a loop body with assembly or machine instructions greater than an assembly or machine instruction threshold or a determination that the process comprises an atomic instruction or an atomic group of instructions and wherein the transactional translation module is to identify the memory contention with respect to the process by determining if a core of the processor exceeds a processor utilization threshold when the process is executed by the core.

5. The apparatus according to claim 1, wherein the transactional translation module is to determine whether the transactional process may be executed by a hardware-based transactional execution process, wherein the hardware-based transactional execution process comprises a lock elision, wherein the lock elision comprises at least one of a hardware lock elision or a restricted transactional memory.

6. The apparatus according to claim 1, wherein to re-write the process to form the transactional process comprises to decode a critical code region of the process, to identify regular lock/unlock instructions in the critical code region, to determine a code representation of the critical code region, wherein the code representation of the critical code region comprises a transactional lock acquire and a transactional lock release, to determine a binary machine code corresponding to the code representation of the critical code region as the transactional process, and to store the transactional process in at least one of a register or a stack of the computer processor for execution, wherein the speculative execution results in one of an atomic commit with respect to the transactional process or ignoring the result of the transactional process.

7. A computer implemented method, comprising:
identifying, by a computer processor, a memory contention with respect to a process of the computer processor;
re-writing, by the computer processor, the process to form a transactional process; and
executing, by the computer processor, the transactional process in a speculative execution.

8. The method according to claim 7, wherein identifying a memory contention with respect to the process further comprises obtaining a performance data with respect to the process and determining if the performance data is consistent with the memory contention, wherein determining if the performance data is consistent with the memory contention comprises determining if a central processing unit process utilization threshold is exceeded when the process is executed.

9. The method according to claim 8, wherein determining if the performance data is consistent with the memory contention further comprises at least one of determining that the process comprises a loop body with assembly or machine instructions greater than an assembly instruction threshold or determining that the process comprises an atomic instruction or an atomic group of instructions.

10. The method according to claim 7, further comprising determining, by the computer processor, whether the transactional process may be executed by a hardware-based transactional execution process, wherein the hardware-based transactional execution process comprises a lock elision, wherein the lock elision comprises at least one of a hardware lock elision or a restricted transactional memory.

11. The method according to claim 7, wherein re-writing the process to form the transactional process comprises decoding a critical code region of the process, identifying regular lock/unlock instructions in the critical code region, determining a code representation of the critical code region, wherein the code representation of the critical code region comprises a transactional lock acquire and a transactional lock release, determining a binary machine code corresponding to the code representation of the critical code region as the transactional process, and storing the transactional process in at least one of a register or a stack of the computer processor for execution, wherein the speculative execution results in one of an atomic commit with respect to the transactional process or ignoring the result of the transactional process.

12. An apparatus for computing, comprising:
one or more processors;
program means operated by the one or more processors to identify a memory contention with the apparatus with respect to a process of the apparatus including program means to obtain a performance data with respect to the process and program means to determine if the performance data is consistent with the memory contention;
program means operated by the one or more processors to re-write the process to form a transactional process of the apparatus; and
program means operated by the one or more processors to execute the transactional process in a speculative execution of the apparatus.

13. The apparatus according to claim 12, wherein program means to determine if the performance data is consistent with the memory contention comprises program means operated by the one or more processors to determine if a central processing unit process utilization threshold for the apparatus is exceeded when the process is executed and program means operated by the one or more processors to determine at least one of whether the process comprises a loop body with assembly or machine instructions greater than an assembly or machine instruction threshold or whether the process comprises an atomic instruction or an atomic group of instructions.

14. The apparatus according to claim 12, further comprising program means operated by the one or more processors to determine whether the transactional process may be executed by a hardware-based transactional execution process, wherein the hardware-based transactional execution process comprises a lock elision, and wherein the lock elision comprises at least one of a hardware lock elision or a restricted transactional memory.

15. The apparatus according to claim 12, wherein program means to re-write the process to form the transactional process comprises program means operated by the one or more processors to decode a critical code region of the process, identify regular lock/unlock instructions in the critical code region, determine a code representation of the critical code region, wherein the code representation of the critical code region comprises a transactional lock acquire and a transactional lock release, determine a binary machine code corresponding to the code representation of the critical code region as the transactional process, and program means operated by the one or more processors to store the transactional process in at least one of a register or a stack of the apparatus for execution and wherein the speculative execution results in one of an atomic commit with respect to the transactional process or ignoring the result of the transactional process.

16. One or more non-transitory computer-readable media comprising instructions that cause a computer device, in response to execution of the instructions by a processor of the computer device, to:
identify a memory contention with respect to a process of the computer device;
re-write the process to form a transactional process of the computer device; and
execute the transactional process in a speculative execution by the computer device.

17. The non-transitory computer-readable media according to claim 16, wherein to identify the memory contention with respect to the process further comprises to obtain a performance data with respect to the process and determine if the performance data is consistent with the memory contention.

18. The non-transitory computer-readable media according to claim 17, wherein the computer device is further caused to obtain the performance data from at least one of a performance monitor module in the processor or a profiling module of the computer device.

19. The non-transitory computer-readable media according to claim 17, wherein to determine if the performance data is consistent with the memory contention comprises to determine if a central processing unit process utilization threshold for the processor is exceeded when the process is executed.

20. The non-transitory computer-readable media according to claim 19, wherein to determine if the performance data is consistent with the memory contention further comprises at least one of to determine that the process comprises a loop body with assembly or machine instructions greater than an assembly or machine instruction threshold or to determine that the process comprises an atomic instruction or an atomic group of instructions.

21. The non-transitory computer-readable media according to claim 16, wherein the computer device is further caused to determine whether the transactional process may be executed by a hardware-based transactional execution process.

22. The non-transitory computer-readable media according to claim 21, wherein the hardware-based transactional execution process comprises a lock elision.

23. The non-transitory computer-readable media according to claim 22, wherein the lock elision comprises at least one of a hardware lock elision or a restricted transactional memory.

24. The non-transitory computer-readable media according to claim 16, wherein to re-write the process to form the transactional process comprises to decode a critical code region of the process, to identify regular lock/unlock instruction in the critical code region, to determine a code representation of the critical code region, wherein the code representation of the critical code region comprises a transactional lock acquire and a transactional lock release, to determine a binary machine code corresponding to the code representation of the critical code region as the transactional process, and to store the transactional process in at least one of a register or a stack of the computer device for execution.

25. The non-transitory computer-readable media according to claim 16, wherein the speculative execution results in one of an atomic commit with respect to the transactional process or ignoring the result of the transactional process.

* * * * *